United States Patent Office 2,926,718
Patented Mar. 1, 1960

2,926,718

COMPOSITION COMPRISING CHLORINATED BUTYL RUBBER, ZINC OXIDE, AND A CURING AID, PROCESS FOR VULCANIZATION THEREOF, AND VULCANIZED PRODUCT OBTAINED THEREBY

Francis P. Baldwin, Colonia, and Robert M. Thomas, Westfield, N.J., assignors to Esso Research and Engineering Company, a corporation of Delaware No Drawing. Application September 24, 1956
Serial No. 611,777

18 Claims. (Cl. 152—330)

This invention relates to the vulcanization of chlorinated rubbery copolymers of isoolefins and multiolefins, preferably chlorinated butyl rubber, and to the resulting compositions formed thereby. More particularly, the present invention relates to curing chlorinated rubbery isoolefin-multiolefin copolymers in the substantial absence of added elemental sulfur by an admixture of at least one bivalent metal oxide, preferably zinc oxide, and certain thiuram sulfides and/or thiocarbamates.

The present invention is a continuation-in-part of U.S. patent application Serial No. 512,182, filed May 31, 1955 in names of Francis P. Baldwin and Robert M. Thomas and is also a continuation-in-part of application Serial No. 597,993, filed July 16, 1956 in the names of Francis P. Baldwin and Robert M. Thomas.

It is known that unmodified isoolefin-multiolefin rubbery copolymers or chlorinated isoolefin-multiolefin rubbery copolymers may be cured by heating the same at an elevated temperature in the presence of minor proportions of a combination of curatives comprising an admixture of sulfur, zinc oxide, and thiuram sulfides and/or certain thiocarbamates. It has also been recently discovered that chlorinated isoolefin-multiolefin rubbery copolymers, such as disclosed and claimed in Serial No. 512,182, may be cured in the absence of added elemental sulfur by basic metal compounds which are advantageously bivalent metal oxides, of which zinc oxide is preferred. However, the zinc oxide type of cure for chlorinated isoolefin-multiolefin rubbery copolymers is not as rapid as obtained by the abovementioned combination of curatives, namely sulfur, zinc oxide and either thiuram sulfides or thiocarbamates.

Although unmodified isoolefin-multiolefin copolymers such as butyl rubber may be effectively vulcanized with the last-mentioned combination of curatives, it is also known that the omission of any one of the three components of the curative combination results in substantially no vulcanization. This is known to be the case particularly when sulfur is the component omitted.

In accordance with the present invention, it has now been found that chlorinated isoolefin-multiolefin rubbery copolymers and particularly chlorinated butyl rubber may be effectively cured solely by the combination of a bivalent metal oxide such as zinc oxide and a curing aid which is either a thiuram sulfide and/or a thiocarbamate. In fact, the omission of the sulfur has surprisingly been found not to cause any loss of benefits such as fast cure rate and further, has been found to result in a vulcanizate possessing improved dynamic fatigue resistance, i.e., decreased dynamic drift during flexing as shown by Goodrich Flexometer tests.

In practicing the present invention, 100 parts by weight of the unvulcanized, chlorinated isoolefin-multiolefin rubbery copolymer, prior to curing, is compounded in the substantial absence of added elemental sulfur with about 1 to 50, advantageously about 2 to 20, preferably about 4 to 10 parts by weight of zinc oxide and about 0.05 to 15.0, advantageously about 0.1 to 10.0, preferably about 0.1 to 4.0 parts by weight of a curing aid such as a thiuram sulfide and/or a thiocarbamate. The resulting composition is then subsequently vulcanized, also in the substantial absence of added elemental sulfur, as more fully described hereinafter. More particularly, the above new and useful vulcanizable compositions are then cured in the substantial absence of added elemental sulfur at a temperature of from between about room temperature to about 450° F., advantageously between about 200° and 400° F., preferably between about 250° and 400° F. for a period of time of between about 0.05 minute up to about several hours or more, preferably for about 0.1 minute to about 5 hours, to give improved vulcanizates having outstanding dynamic fatigue resistance.

It is a further discovery of the present invention that when chlorinated isoolefin-multiolefin rubbery copolymers particularly chlorinated butyl rubbers, are covulcanized in accordance with the invention, with minor proportions, say about 0.5 to 30% by weight, preferably about 1 to 10% by weight based on total rubber of more highly unsaturated rubbers such as dienestyrene copolymers (GR–S rubber), natural rubber or the like; the resulting compositions surprisingly exhibit both improved heat aging characteristics and ozone resistance compared to the values obtained when evaluating vulcanizates containing no highly unsaturated rubber.

The thiuram sulfides found particularly useful for the purposes of the present invention include, among others, $C_1$ to $C_{10}$ alkyl (or $C_6$ to $C_{12}$ aryl, aralkyl or alkaryl) thiuram sulfides such as tetramethyl thiuram monosulfide, tetramethyl thiuram disulfide, tetraethyl thiuram disulfide, tetrabutyl thiuram disulfide, tetraamyl thiuram disulfide, di-N-pentamethylene thiuram tetrasulfide, tetraphenyl thiuram disulfide, tetrabenzyl thiuram disulfide, N-dimethyl-N'-phenyl aminoethyl-N'-phenyl thiuram disulfide, mixtures thereof, etc.

The thiocarbamates found to be particularly useful for the purposes of the present invention include, among others, such materials as metal or amine salts of thiocarbamic acids such as tellurium diethyl dithiocarbamate;
zinc dimethyl dithiocarbamate;
copper dimethyl dithiocarbamate;
cadmium diamyl dithiocarbamate;
zinc dibutyl dithiocarbamate;
selenium dipropyl dithiocarbamate;
lead dimethyl dithiocarbamate;
bismuth dimethyl dithiocarbamate;
lead(phenylaminoethyl)phenyl dimethyl dithiocarbamate;
2,4-dinitrophenyl dimethyl dithiocarbamate;
potassium diethyl dithiocarbamate;
lead(-o-tolylaminoethyl)-o-tolyl dimethyl dithiocarbamate;
zinc-N-pentamethylene dithiocarbamate;
zinc dibenzyl dithiocarbamate;
N-pentamethylene ammonium pentamethylene dithiocarbamate;
zinc (phenyl aminoethyl) phenyl dimethyl dithiocarbamate;
mixtures thereof, etc.

It is also within the purview of the present invention to vulcanize about 100 parts by weight of chlorinated isoolefin-multiolefin copolymers at an accelerated rate in the substantial absence of added elemental sulfur, not only in the presence of a minor proportion, sufficient to improve dynamic fatigue resistance on flexing, of an admixture of a basic metal oxide such as zinc oxide and thiuram sulfides and/or thiocarbamates, but also with about 0.01 to 10, advantageously about 0.1 to 5.0, preferably about 0.2 to 3.0 parts by weight of accelerators containing combined sulfur. Typical accelerators include benzothiazyl disulfide,
mercaptobenzothiazole,
bis-4,5-dimethyl thiazyl disulfide,
zinc benzothiazyl sulfide,
dinitrophenyl benzothiazyl sulfide,
2-mercaptothiazoline,
benzothiazyl-2-monocyclohexyl sulfenamide,
benzyl hexamethylene tetraammonium?2-benzothiazyl sulfide,
2-mercapto imidazoline,
phenyl aminomethyl-2-benzothiazyl sulfide,
mixtures thereof, etc.

Also, the foregoing novel vulcanizable chlorinated rubbery copolymer-containing compositions which are preferably chlorinated butyl rubber-containing compositions may be blended with, prior to vulcanization, conventional amounts of carbon blacks, mineral fillers such as clays, silica, metal oxides, talc, diatomaceous earth, plasticizers, glycols, resins, organic esters, extender oils, anti-oxidants or the like.

The chlorinated rubbery isoolefin-multiolefin copolymers to be used may be made by mild chlorination of the synthetic rubber as more fully described hereinafter. The synthetic rubber to be chlorinated is advantageously a high molecular weight copolymer of a major proportion of an isoolefin and a minor proportion of a multiolefin. Copolymers of the above general type, having Staudinger molecular weights between about 20,000 and 100,000 and iodine numbers of between about 0.5 and 50 (Wijs), especially where the copolymer contains about 85 to 99.5 weight percent of a $C_4$ to $C_8$ isoolefin such as isobutylene, 2-methyl-1-butene, 3-methyl-1-butene, or the like, with about 15 to 0.5 weight percent of a multiolefin of about 4 to 14, preferably about 4 to 6 carbon atoms, are commonly referred to in patents and in technical literature as "butyl rubber" or GR–I rubber (Government Rubber-Isobutylene). For instance, the preparation and uses of butyl-type rubbers are described in U.S. Patent 2,356,128 to Thomas et al. and in the book "Synthetic Rubber" by G. S. Whitby. The rubber preferably comprises the reaction product of isobutylene with a conjugated diolefin such as isoprene, butadiene, dimethyl butadiene, piperylene or such multiolefins as cyclopentadiene, dicyclopentadiene, cyclohexadienes, dimethallyl, allo-ocymene, vinyl fulvenes, etc. The reaction product of isobutylene and isoprene is preferred.

The above-described rubbery copolymer, which is preferably butyl rubber, is then chlorinated, as disclosed and claimed in Serial No. 512,182, in a manner which does not degrade the molecular weight thereof, but sufficiently to produce a rubber which retains its tensile strength upon heat-aging. The chlorination is preferably carried out so as to make the resulting chlorinated butyl rubber contain about at least 0.5 weight percent (preferably at least about 1.0 weight percent) combined chlorine, but not more than about "X" weight percent combined chlorine wherein:

$$X = \frac{35.46L}{(100-L)M_1 + L(M_2+35.46)} \times 100$$

and:

$L$ = mole percent of the multiolefin in the polymer
$M_1$ = molecular weight of the isoolefin
$M_2$ = molecular weight of the multiolefin
35.46 = atomic weight of chlorine Restated, there should be at least about 0.5 weight percent of combined chlorine in the polymer but not more than about one atom of chlorine combined in the polymer per molecule of multiolefin present therein; i.e., not more than about one atom of combined chlorine per double bond in the polymer. Normally, the chlorine content of the chlorinated polymer should be within about 0.1 to 10.0 weight percent, preferably about 0.5 to 3.0 weight percent chlorine based on polymer.

Suitable chlorinating agents which may be employed are molecular chlorine, alkali metal hypochlorites, sulfur chlorides, chlorohydantoins, pyridinium chloride perchloride, N-chlorosuccinimide, alpha-chloroacetoacetanilide, tri-chlorophenol chloride, N-chloroacetamide, beta-chlor-methyl phthalimide and other common chlorinating agents. The preferred chlorinating agents are molecular chlorine and sulfuryl chloride.

The chlorination is conducted at temperatures of from above about 0° to about 100° C. and preferably at about 20° to 80° C. for about one minute to several hours, the temperature and time being regulated to chlorinate the rubbery copolymer to the extent abovementioned. The pressure may vary from about 0.5 to 500 p.s.i.a., atmospheric pressure being satisfactory.

It has been found that at these chlorination conditions, for every chlorine atom combined with and retained in the polymer, one hydrogen atom evolves from the polymer. When molecular chlorine, or compounds liberating molecular chlorine (at the reaction conditions) are used in the presence of substantially inert solvents, about one mole of HCl is liberated per mole of chlorine consumed and per gram atom of chlorine retained in the polymer. When other chlorinating agents, containing one or more reactive chlorine atoms per mole in the form of combined chlorine are used, such as N-chloroacetamide, N-chlorosuccinimide, dimethyl dichloro-hydantoin, etc., at least some of the hydrogen atoms removed from the polymer (which amount to about one hydrogen atom per chlorine atom entering the polymer) may combine with the residue of the chlorinating agent. These proportions of chlorine being combined with the polymer, and hydrogen being removed from the polymer, are a strong indication that the chlorination takes place essentially by hydrogen substitution.

Also, in the case of using molecular chlorine as the chlorinating agent, and at the conditions stated above, it is highly preferable and in many cases necessary (such as when employing elemental chlorine in a completely inert solvent and under conditions such that all of the chlorine is consumed) to limit the amount of chlorine present in the reaction mixture so as not substantially to exceed about 2 times the amount of chlorine which will be retained in the rubbery copolymer. If this amount of chlorine in the reaction mixture is substantially exceeded, more chlorine than one atom per double bond in the polymer tends to enter the polymer causing rapid degradation thereof. In the case of less reactive chlorinating agents containing combined chlorine, the proportion of chlorine added to the reaction mixture may be a greater multiple of that retained in the polymer, say from above about 2 to about 5 times that retained in the polymer, depending on the reactivity of the chlorinating agent so as to establish reasonable chlorination rates such as will not tend to substantially degrade the polymer. Also, obviously when chlorinating with elemental chlorine in a solvent medium capable of reaction with chlorine, higher concentrations of chlorine than about 2 times that which will be retained in the copolymer may be used; such concentrations depending on the relative reactivity and concentration of the solvent and polymer respectively, under the reaction conditions used.

The chlorination of the rubbery copolymer may be accomplished in various ways. One process comprises preparing a solution of the copolymer as above, in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, naphthalene, chlorobenzene, chloroform, trichloroethane, carbon tetrachloride, etc., and adding thereto chlorine or other chlorinating agent, optionally in solution, such as dissolved in an alkyl chloride, carbon tetrachloride, etc. Another variation comprises employing the chlorinating agent in the form of a gas, and contacting the gas with a solution of the copolymer. The use of elevated or depressed pressures is optional since atmospheric pressure is satisfactory, although the pressure may vary, depending upon the foregoing temperatures and times from about 1 to 250 p.s.i.a.

The concentration of the copolymer, such as butyl rubber, in the solvent will depend upon the type of reactor, molecular weight of the rubbery copolymer, etc. In general, the concentration of a butyl rubber having a viscosity average molecular weight of about 50,000 to about 2,000,000, preferably about 200,000 to about 1,000,000, if the solvent is a substantially inert hydrocarbon, will be between about 1 and 80% by weight, preferably about 5 to 40%. If chlorine gas is employed, it may also be diluted with up to about 20 times its volume, preferably about 0.1 to 5.0 times its volume of an inert gas such as nitrogen, methane, ethane, carbon dioxide, etc.

In the case of chlorinating butyl rubber with gaseous chlorine in batch procedure, the chlorine is preferably added relatively slowly (e.g., over a period of time of about 1 to 30 minutes) to a preformed solution of the butyl rubber with agitation. For a continuous process, preformed butyl rubber in solution, and gaseous elemental chlorine are preferably contacted in an orifice mixing zone or preferably a multiple orifice mixing zone of any commercially available type wherein the butyl solution passes consecutively through a plurality of orifices, the chlorine gas being advantageously bubbled into the butyl rubber solution at one or more points. Alternatively, a plurality of agitated reaction zones in series may be employed, wherein the chlorine is added to the first zone, or the process staged, so as to increase the chlorine content in each zone to the final chlorine concentration desired.

The resulting chlorinated rubbery copolymer, such as butyl rubber, may be recovered in various manners. The copolymer may be precipitated with acetone or an alcohol or any other known non-solvent for the rubber and dried under about 1 to 760 millimeters or higher of mercury pressure absolute, at temperatures of about 0° to 180° C., preferably about 50° to 150° C. (e.g., 70° C.). Other methods of recovering the chlorinated rubbery copolymer, from the hydrocarbon solution of the same, are by conventional spray or drum drying techniques. Alternatively, the chlorinated rubbery copolymer-containing solution may be injected into a vessel containing agitated water heated to a temperature sufficient to flash off the hydrocarbon solvent and form an aqueous slurry of the rubbery chlorinated copolymer. This copolymer may then be separated from the slurry by filtration, dried and recovered as a "crumb" or as a dense sheet or slab by conventional milling and/or extruding procedures.

The chlorinated copolymer formed advantageously has a viscosity average molecular weight between about 250,000 and 2,000,000 (i.e., about 10,000 to 150,000 Staudinger) and a mole percent unsaturation between about 0.2 to 15.0, preferably about 0.5 to 5.0. The copolymer before curing may be further compounded with various fillers such as carbon blacks, clays, silica, or titanium dioxide, etc., as well as with plasticizers which are preferably hydrocarbon plasticizer oils, antioxidants, resins, etc.

In order to more fully illustrate the present invention, the following experimental data are given.

CHLORINATED BUTYL RUBBER "A"

One run was made chlorinating butyl rubber. The butyl rubber employed was a commercial butyl rubber corresponding to GR-I-18 rubber. Such a rubber is produced by employing in the polymerization feed about 2.5 weight percent isoprene and about 97.5% isobutylene. The butyl rubber had an eight minute Mooney viscosity at 212° F. of 71.0, a mole percent unsaturation of 1.47, a voscosity average molecular weight of 420,000, and contained about 0.25 weight percent based on rubber of N-lauroyl-p-amino phenol antioxidant.

The chlorination of a solution of the above uncured butyl rubber was conducted in a 1500-gallon glass-lined Pfaudler reactor, equipped with an agitator, baffle, submersed stainless steel sparger ring and a conduit leading into said ring.

The solvent for the butyl rubber was as follows:

| Component: | Volume percent |
|---|---|
| 2,2-dimethyl butane | 0.1 |
| 2,3-dimethyl butane | 2.40 |
| 2-methyl pentane | 10.75 |
| 3-methyl pentane | 12.45 |
| n-hexane | 44.85 |
| Methyl cyclopentane | 20.5 |
| 2,2-dimethyl pentane | 0.4 |
| Benzene | 7.7 |
| Cyclohexane | 0.85 |

Gaseous chlorine was continuously added to the butyl rubber solution over a period of one-half hour at a temperature level of 30° C. and under about 25 p.s.i.g. pressure. The chlorine was added to the reactor through the conduit via the sparger ring which, as hereinbefore mentioned, was immersed below the liquid level of the agitated butyl rubber solution. The chlorination was then terminated and the solution, containing the chlorinated butyl rubber formed, agitated for an additional ten minutes. The resulting solution of chlorinated butyl rubber was then water-washed three times to remove dissolved hydrogen chloride, the last water-wash containing enough NaOH to render the resulting wash-water neutral. There was then added to the solution 0.2 pound per 100 pounds of chlorinated butyl rubber as a 10 weight percent solution in hexane of an antioxidant (2,6-di-tertiary butyl para cresol).

The absolute amounts of butyl rubber, solvent and gaseous chlorine added, as well as the calculated percent of added chlorine based on polymer and resulting percent of chlorine combined in the polymer were as follows:

| Pounds of Butyl Rubber | Pounds of Solvent | Pounds of Chlorine | Percent Chlorine Added | Percent Chlorine Combined in the Polymer |
|---|---|---|---|---|
| 1,200 | 6,800 | 33 | 2.75 | 1.17 |

The resulting water-washed solution containing the chlorinated rubbery butyl product "A" was then recovered by injecting the dissolved chlorinated polymer into an agitated aqueous solution containing a commercial wetting agent of the aliphatic poly oxyethylene ether type (Stearox A. J.) in an amount of about 0.1 lb. per 100 lbs. of chlorinated rubber as a dispersing aid. The solution also contained about 0.5 lb. of zinc stearate (an anti-tack agent) per 100 lbs. of chlorinated butyl rubber; the hot agitated aqueous solution containing 5,000 lbs. of water per 100 lbs. of chlorinated butyl rubber.

The agitated solution was maintained at a temperature of about 185° F. whereby to flash off the solvent and form an aqueous slurry of the chlorinated butyl rubber in water. This slurry was then filtered and chlorinated butyl rubber "A," which was in the form of a wet "crumb," was fed to a dewatering extruder where the water content was reduced to about 5% by weight. The extrudate was then fed to a degassing extruding means where the water content was reduced to below 0.5% by weight. The Mooney viscosity (8 minutes at 212° F.)

for the resulting chlorinated butyl rubber "A" (as finished) was 67.

Example I

Two samples, each containing 100 parts by weight of chlorinated butyl rubber "A" were compounded on a cold rubber mill with 1 part by weight of stearic acid, 50 parts by weight of HAF carbon black, 5 parts by weight of zinc oxide, 0.5 part by weight of an antioxidant known as 2,2'-methylene-bis(4-methyl-6-tertiary butyl phenol) and 5 parts by weight of a hydrocarbon plasticizer oil (Necton 60), as well as with the following amounts of tetramethyl thiuram disulfide (i.e., tuads):

|  | Parts by Weight | |
|---|---|---|
|  | Sample 1 | Sample 2 |
| Tuads | 0 | 1.0 |

The Necton 60 hydrocarbon plasticizer oil is derived from a naphthenic base crude oil and has the following physical properties:

| Property | Employed | General Range |
|---|---|---|
| Specific Gravity | 0.90 | 0.8–0.97 |
| Flash Point, ° F. (open cup method) | 445 | 300–550 |
| Viscosity, SSU @ 100° F | 510 | 50–1,000 |
| Viscosity, SSU @ 210° F | 55 | 20–200 |
| Iodine No. (cg./g.) | 16 | 0–30 |

The foregoing compounded chlorinated butyl rubber blends were then cured at 307° F. for the periods of time indicated hereinafter. The tensile strength (in p.s.i.), extension modulus at 300% elongation (in p.s.i.) and elongation (in percent) were as follows:

| Cured | Sample 1 | | | Sample 2 | | |
|---|---|---|---|---|---|---|
|  | Tensile | Mod. | Elong. | Tensile | Mod. | Elong. |
| 10 min. @ 307° F | 1,025 | 335 | 530 | 2,470 | 1,625 | 435 |
| 20 min. @ 307° F | 1,490 | 905 | 460 | 2,430 | 1,795 | 395 |
| 40 min. @ 307° F | 1,705 | 1,195 | 395 | 2,445 | 1,970 | 360 |

The above data show that the cure rate, tensile strength and modulus of chlorinated butyl rubber, vulcanized in accordance with the invention in the absence of added elemental sulfur, but in the presence of a combination of zinc oxide and a tetramethyl thiuram sulfide, are all improved. More particularly, the cure in accordance with the present invention results in a much higher tensile strength and modulus without significantly lowering the elongation.

Two additional samples (i.e., samples 3 and 4) were compounded on a rubber mill. Sample 3 was compounded in the same manner as sample 1 above, whereas sample 4 was compounded in the same manner as sample 2. These compounded chlorinated butyl rubber-containing compositions were then each cured for 45 minutes at 307° F. in order to vulcanize the same.

Each vulcanizate formed was then subjected to a very severe Goodrich Flexometer Test which is used for tire studies. This conventional test determines the stability of the respective vulcanizates under flexing conditions. In the Goodrich Flexometer test, the static load was 89 p.s.i., the stroke in inches on the flexometer was 0.25 inch at a frequency of 30 cycles/second and the oven temperature was 100° C. All slugs used were 1 inch long cylinders having 11/16 inch diameter. The most significant data are the permanent set, dynamic drift and heat build-up (temperature rise). The results were as follows:

| Goodrich Flexometer Data | Sample 3 | Sample 4 |
|---|---|---|
| Temperature Rise, ° C | 38 | 21. |
| Dynamic Drift, inches | 0.092 | 0.000. |
| Permanent Set, Percent |  | 1.50. |
| Appearance | Blew out | Excellent. |
| Run Time, minutes | 14 | 30. |

The above data show that the presence of tetramethyl thiuram disulfide, in addition to zinc oxide, in a non-sulfur cure of chlorinated butyl rubber, results in much better dynamic fatigue resistance, as shown by the negligible dynamic drift and low permanent set of the vulcanizate cured in accordance with the present invention, compared to the vulcanizate not containing tetramethyl thiuram disulfide. This latter vulcanizate exhibited higher dynamic drift. The permanent set could not be measured since the sample blew out during testing due to the rapid rise in temperature.

Example II

One hundred parts by weight of either chlorinated butyl rubber "A" or unmodified butyl rubber were compounded on a rubber mill into the following compositions:

| Component | Parts by Weight | | |
|---|---|---|---|
|  | Sample A | Sample B | Sample C |
| Chlorinated Butyl Rubber "A" | 100 | 100 | 0 |
| Unmodified Butyl Rubber (GR-I-18) | 0 | 0 | 100 |
| Carbon Black (HAF) | 50 | 50 | 50 |
| Zinc Oxide | 5 | 5 | 5 |
| Stearic Acid | 1.0 | 0.5 | 1.0 |
| Sulfur | 0 | 2 | 0 |
| Tetramethyl Thiuram Disulfide | 1 | 0 | 1 |
| Tellurium diethyl dithiocarbamate | 0 | 1 | 0 |
| Antioxidant, i.e., 2,2'-methylenebis(4-methyl-6-tertiary butyl phenol) | 1 | 0 | 1 |

The foregoing compounded chlorinated butyl rubber blends were then cured in a mold for 15 minutes at 307° F., the shape of each respective pad formed being 4 x 6 x 0.075". The following physical inspections were noted:

| Property | Sample A | Sample B | Sample C |
|---|---|---|---|
| Tensile Strength, p.s.i | 2,730 | 2,250 | 360 |
| Modulus at 300% Elong., p.s.i | 1,690 | 1,290 | 50 |
| Elongation, Percent | 450 | 470 |  |
| Shore A Hardness | 61 | 55 |  |

The above data show that the chlorinated butyl rubber composition of sample A, compounded and cured in accordance with the present invention, exhibited superior tensile strength, modulus and Shore hardness compared to either a chlorinated butyl rubber-sulfur-containing composition cured under the same conditions (sample B), or an unmodified butyl rubber (sample C) compounded the same as sample A (i.e., without sulfur) and also cured under the same conditions. Sample C did not effectively cure, i.e., did not result in a technically useful vulcanizate.

Example III

The same general procedure employed as in Example I was repeated, except that several different types of cures were employed, as indicated hereinafter. The Goodrich Flexometer test was likewise run in the same manner as in Example I, except as otherwise indicated.

The most significant data in this example were found to be the dynamic drift, permanent set, and appearance of the slug after testing. It was found that the appearance of the slug after the test is in accord with the quantitative behavior of the foregoing parameters. The final percent dynamic compression recorded in these tests gives a good indication of how much deformation the slug was undergoing at the end of the test. The appearance of the slugs was compared by cutting the same open, inspecting and rating them as follows:

| Appearance: | Rating |
|---|---|
| No porosity, no delamination | 0 |
| No porosity, slight delamination | 1 |
| Very slight porosity | 2 |
| Slight porosity | 3 |
| Porous | 4 |
| Very porous | 5 |
| Broken in center only (not porous) | 6 |
| Large hole in center and porous | 7 |
| Broken through but not porous | 8 |
| Broken through and porous (blown) | 9 |
| Broken through and delaminated | 10 |

The following types of cures were employed.

The above data show that chlorinated butyl rubber cured in the absence of sulfur with the combination of zinc oxide and tetramethyl thiuram disulfide (or zinc oxide and zinc dibutyl dithiocarbamate) in accordance with the present invention exhibited excellent dynamic drift (i.e., 0.4–0.5% compared with values between about 3.6 and 21.9% for other known cures). The permanent set of the vulcanizate produced in accordance with the present invention was also by far the lowest compared to other known vulcanizates.

*Examples IV–VII*

The same general procedure as in Example III was again repeated except that minor proportions of natural rubber (smoked sheets) or GR-S rubber were added to the unmodified butyl rubber or chlorinated butyl rubber

TABLE I

| Cure No. | 1 | 2 | 2A | 3 | 4 | 5 | 6 | 7 | 8 | 9 |
|---|---|---|---|---|---|---|---|---|---|---|
| Chlorinated Butyl Rubber "A" | 100 | 100 | 100 | 100 | 100 | 100 | | | | |
| GR-I-18 | | | | | | | 100 | | 100 | 100 |
| GR-I-25 | | | | | | | | 100 | | |
| 2,2'-methylene-bis(4-methyl-6-tertiary butyl phenol) | 1 | 1 | 1 | | | 1 | | | | |
| Stearic Acid | 1 | 1 | 1 | 0.5 | 1 | | 0.5 | 0.5 | 0.5 | 0.5 |
| Carbon Black (HAF Black) | 50 | 50 | 50 | 50 | 50 | 50 | 50 | 50 | 50 | 50 |
| Zinc Oxide | 5 | 5 | 5 | 5 | 5 | | 5 | 5 | 5 | 5 |
| Magnesium Oxide | | | | | | 5 | | | | |
| Tellurium diethyl dithiocarbamate | | | | 2 | | | 2 | 2 | | 1 |
| Tetramethyl thiuram disulfide | | 1 | | | | | | | | |
| Zinc dibutyl dithiocarbamate | | | 1 | | | | | | | |
| Benzothiazyl disulfide | | | | | 4 | | | | 4 | |
| Diethylene Triamine | | | | | | 2 | | | | |
| Lead Dioxide (PbO₂) | | | | | 2 | | | | | |
| Red Lead (Pb₃O₄) | | | | | | | | | 5 | 9 |
| Quinone Dioxime (GMF) | | | | | 2 | | | | 1.5 | |
| Dibenzo GMF | | | | | | | | | | 6 |

TABLE II

| | Recipe, Cured 45' at 307° F. | | | Goodrich Flexometer, 30 Minutes, 100° C., 0.25 in. stroke, 89 p.s.i. (15 lb. wt.) 32 c.p.s. | | | | | |
|---|---|---|---|---|---|---|---|---|---|
| Sample No. | Rubber | Cure No. | Type of Cure | Dynamic Drift, Percent | Final Dynamic Compression | Permanent Set, Percent | Max. Temp. Rise, °C. | Minutes to Max. Temp. | Rating of Slug |
| Ex. III-a | Chlor. Butyl Rubber A. | 2 | ZnO+Tetramethyl Thiuram Disulfide. | 0.4 | 9.0 | 2.2 | 24 | 14 | 0 |
| Ex. III-b | do | 2A | ZnO+Zinc dibutyl dithiocarbamate. | 0.5 | 10.0 | 2.0 | 20 | 13 | 0 |
| d | do | 1 | ZnO | ¹22.3 | ¹43.4 | ¹8.9 | ¹50 | ¹17 | 9 |
| e | do | 3 | Sulfur+tellurium diethyl dithiocarbamate. | 9.6 | 17.6 | 8.3 | 31 | 28 | 3 |
| f | do | 4 | p-quinone dioxime | 14.9 | 31.3 | 20.6 | 35 | 12 | 7 |
| g | do | 5 | diethylene triamine+ MgO. | ²3.6 | ²36.3 | (²) | ²35 | ²3 | 10+ |
| h | GR-I-18 | 6 | Sulfur+tellurium diethyl dithiocarbamate. | 11.8 | 19.1 | 16.9 | 24 | 12 | 3 |
| i | GR-I-25 | 7 | Sulfur+tellurium diethyl dithiocarbamate. | 12.1 | 16.2 | 18.0 | 20 | 12 | 2 |
| j | GR-I-18 | 8 | p-quinone dioxime | 11.4 | 26.4 | 9.5 | 36 | 10 | 4 |
| k | GR-I-18 | 9 | p-quinone dioxime dibenzoate. | 21.9 | 35.6 | 21.0 | 33 | 19 | 9 |
| l | GR-I-18 | 8 | S+Zinc dibutyl dithiocarbamate. | 10.8 | 19.7 | 17.4 | 31 | 22 | ³10+ |

[1] Failed at 19 minutes (90'/307° F. cure failed at 14 min.).
[2] Failed at 3 minutes (90'/307° F. cure failed at 9 min.).
[3] Not measurable.

respectively, the following physical inspections being noted:

TABLE III

| Sample No. | Rubber | Type of Cure | Cure No. | Dynamic Drift, Percent | Final Percent Dynamic Compression | Permanent Set, Percent | Max. Temp. Rise, °C. | Minutes to Max. Temp. |
|---|---|---|---|---|---|---|---|---|
| Ex. IV | Chlorinated Butyl Rubber A | ZnO+tetramethyl thiuram disulf. | 2 | 0.4 | 9.0 | 2.2 | 24 | 14 |
| Ex. V | 98 wt. percent Chlorinated Butyl Rubber A+2 wt. percent smoked sheet. | ___do___ | 2 | 0.0 | 8.0 | 3.5 | 25 | 11 |
| Ex. VI | 98 wt. percent Chlorinated Butyl Rubber A+2 wt. percent GR-S. | ___do___ | 2 | 0.0 | 8.5 | 3.6 | 26 | 22 |
| Ex. VII | 75 wt. percent Chlorinated Butyl Rubber A+25 wt. percent GR-S. | ___do___ | 2 | 3.5 | 12.1 | 4.4 | 42 | 18 |
| m | GR-I-18 | Sulfur+tellurium diethyl dithiocarbamate. | 6 | 11.8 | 19.1 | 16.9 | 24 | 12 |
| n | 98 wt. percent GR-I-18+2 wt. percent smoked sheet. | ___do___ | 6 | 20.2 | 27.9 | 17.4 | 25 | 9 |
| o | 98 wt. percent GR-I-18+2 wt. percent GR-S. | ___do___ | 6 | 19.3 | 26.4 | 18.3 | 30 | 11 |
| p | Chlorinated Butyl Rubber A | ___do___ | 3 | 9.6 | 17.6 | 8.3 | 31 | 28 |
| q | 98 wt percent Chlorinated Butyl Rub. "A"+2% smoked sheet. | ___do___ | 3 | 6.0 | 13.5 | 10.6 | 27 | 21 |
| r | 98 wt percent Chlorinated Butyl Rub. "A"+ 2 wt. percent GR-S. | ___do___ | 3 | 6.2 | 17.5 | 11.0 | 24 | 10 |

Recipe, Cured 45'@307° F. Goodrich Flexometer, 30 minutes, 100° C., 0.25 in. Stroke, 89 p.s.i. (15 lb. wt.) 32 c.p.s.

The above data show that both the dynamic drift and permanent set of the covulcanizates produced in accordance with the invention by curing chlorinated butyl rubber with zinc oxide and tetramethyl thiuram disulfide, in the absence of elemental sulfur, are superior to the dynamic drift and permanent set of either unmodified butyl rubber or chlorinated butyl rubber vulcanized by other known curative systems.

*Example VIII*

Another two samples of chlorinated butyl rubber "A" were compounded on a rubber mill into the following compositions:

| Component | Parts by Weight | |
|---|---|---|
|  | Sample R | Sample S |
| Chlorinated Butyl Rubber "A" | 100 | 100 |
| Carbon Black (HAF) | 50 | 50 |
| ZnO | 5 | 5 |
| Stearic Acid | 1.0 | 1.0 |
| Tetramethyl thiuram disulfide | 1.0 |  |
| Antioxidant, i.e., 2,2'-methylene-bis(4-methyl-6-tert. butyl phenol) | 1.0 | 1.0 |

Each sample was pressed into a 6 x 6 x 0.075" pad at 200° F. for 3 minutes and then cured in open steam at 320° F. for 20 minutes. The cure in the absence of tetramethyl thiuram disulfide gave poor results whereas the cure in the presence of both tetramethyl thiuram disulfide and zinc oxide gave excellent results.

*Examples IX-XIII*

Five additional runs were made vulcanizing and heat aging chlorinated butyl rubber "A" or blends of chlorinated butyl rubber with natural rubber (smoked sheets) and GR-S rubber. The results were as follows when compounded as in Example VIII and vulcanized for 45 minutes at 307° F.

| Example | Composition | Tensile Strength, p.s.i. (after heat aging for 72 hours at 300° F.) |
|---|---|---|
| IX | Chlorinated Butyl Rubber "A" | 830 |
| X | 98 wt. Percent Chlorinated Butyl Rubber "A" + 2 wt. Percent smoked sheets | 1,370 |
| XI | 98 wt. Percent Chlorinated Butyl Rubber "A" + 2 wt. Percent GR-S | 1,370 |
| XII | 75 wt. Percent Chlorinated Butyl Rubber "A" + 25 wt. Percent smoked sheets | 760 |
| XIII | 75 wt. Percent Chlorinated Butyl Rubber "A" X 25 wt. Percent GR-S | 810 |

The above data show that small amounts (e.g., 2% by weight) of GR-S or natural rubber actually improved the heat aging characteristics of chlorinated butyl rubber zinc oxide-tetramethyl thiuram disulfide vulcanizates in that higher tensile strengths were obtained without appreciable change in other stress-strain properties. Also, large amounts of GR-S or natural rubber (e.g., 25% by weight) do not adversely affect the heat aging of chlorinated butyl rubber.

*Examples XIV-XVIII*

Various unmodified and chlorinated butyl rubber compositions were compounded in accordance with one or the other of the following recipes:

| Formulation "T" | | Formulation "U" | |
|---|---|---|---|
| Component | Parts by Weight | Component | Parts by Weight |
| Rubber | 100 | Rubber | 100 |
| Carbon Black (HAF) | 50 | Carbon Black (HAF) | 50 |
| Stearic Acid | 1.0 | Stearic Acid | 1.0 |
| Zinc Oxide | 5.0 | Zinc Oxide | 5.0 |
| Tetramethyl thiuram disulfide | 1.0 | Sulfur | 2.0 |
|  |  | Tellurium diethyl dithiocarbamate | 1.0 |

The ozone resistance of each vulcanizate upon press curing at 307° F. was as follows. The ozone resistance was measured after exposures of 0.25 x 0.075 in. dumpbells at 50% elongation in 0.2% ozone.

| Run | Component | Formulation | Ozone Resistance in Minutes to Break (Press Cure) |
|---|---|---|---|
| Ex. XIV | Chlorinated Butyl Rubber "A" | T | 76 |
| Ex. XV | Chlorinated Butyl Rubber "A" + 2% natural rubber | T | 138 |
| Ex. XVI | Chlorinated Butyl Rubber "A" + 2% GR-S | T | 134 |
| Ex. XVII | Chlorinated Butyl Rubber "A" + 25% natural rubber | T | 119 |
| Ex. XVIII | Chlorinated Butyl Rubber "A" + 25% GR-S | T | 105 |
| W | GR-I-18 + 2% natural rubber | U | 24 |
| X | GR-I-18 + 2% GR-S | U | 28 |
| Y | Chlorinated Butyl Rubber "A" + 2% natural rubber | U | 67 |
| Z | Chlorinated Butyl Rubber "A" + 2% GR-S | U | 66 |

The above data show that small amounts (e.g., 2 wt. percent) and even large amounts (e.g., 25 wt. percent) of natural rubber or GR-S rubber beneficially affect the ozone resistance of chlorinated butyl rubber when covulcanized therewith in the absence of added elemental sulfur by means of a combination of zinc oxide and tetramethyl thiuram disulfide. This is demonstrated by the greater number of minutes required to break the dumpbells containing the abovementioned compositions covulcanized in accordance with the present invention.

Examples XIX to XXVII

In these tests, chlorinated butyl rubber was vulcanized by combinations of zinc oxide with various thiuram sulfides and thiocarbamates. In each test, 100 parts by weight of chlorinated butyl rubber "A" were compounded with 50 parts by weight of HAF carbon black, 1 part by weight of stearic acid, 0.5 parts by weight of the antioxidant, 2,2'-methylene-bis(4-methyl-6-tert. butyl phenol), 10 parts by weight of Necton 60 hydrocarbon plasticizer oil, 5 parts by weight of zinc oxide and 1 part by weight of a modifier (i.e., a thiuram sulfide or a thiocarbamate). The particular modifier, as well as the tensile strength (in p.s.i.), elongation (in percent) and extension modulus at 300% elongation (in p.s.i.) for one or more cure times at 307° F. were as follows:

TABLE IV

| Modifier | Example No. | Cured 10 min. @ 307° F. | | | Cured 20 min. @ 307° F. | | | Cured 40 min. @ 307° F. | | |
|---|---|---|---|---|---|---|---|---|---|---|
| | | Tensile | Elong. | Modulus @ 300% | Tensile | Elong. | Modulus @ 300% | Tensile | Elong. | Modulus @ 300% |
| None | Control | 1,025 | 530 | 335 | 1,490 | 460 | 905 | 1,705 | 395 | 1,195 |
| Tetramethyl thiuram disulfide | 19 | 2,470 | 435 | 1,625 | 2,430 | 395 | 1,795 | 2,445 | 360 | 1,970 |
| Tetramethyl thiuram monosulfide | 20 | 2,265 | 420 | 1,420 | 2,310 | 355 | 1,845 | 2,290 | 335 | 1,975 |
| Lead dimethyl dithiocarbamate | 21 | 2,220 | 380 | 1,650 | 2,225 | 345 | 1,875 | 2,315 | 325 | 2,095 |
| Copper dimethyl dithiocarbamate | 22 | 2,265 | 435 | 1,355 | 2,295 | 390 | 1,595 | 2,190 | 345 | 1,890 |
| Zinc dibutyl dithiocarbamate | 23 | 2,100 | 420 | 1,335 | 2,245 | 400 | 1,500 | 2,255 | 385 | 1,610 |
| Tellurium diethyl dithiocarbamate | 24 | 2,120 | 390 | 1,495 | 2,300 | 375 | 1,745 | 2,310 | 370 | 1,780 |
| Tetraethyl thiuram disulfide | 25 | 2,150 | 440 | 1,345 | 2,345 | 420 | 1,540 | 2,235 | 365 | 1,700 |
| Di-N-pentamethylene thiuram tetrasulfide | 26 | 2,225 | 430 | 1,475 | 2,255 | 385 | 1,540 | 2,450 | 390 | 1,775 |
| Bismuth dimethyl dithiocarbamate | 27 | 1,410 | 510 | 745 | 2,000 | 390 | 1,400 | 2,200 | 340 | 1,850 |
| Lead (o-tolyl amino-ethyl)-o-tolyl dimethyl dithiocarbamate | 28 | 1,600 | 490 | 800 | 2,075 | 405 | 1,450 | 2,200 | 355 | 1,850 |
| 2,4-dinitrophenyl dimethyl dithiocarbamate | 29 | 1,490 | 560 | 650 | 1,925 | 520 | 800 | 2,000 | 495 | 950 |
| N-pentamethylene ammonium pentamethylene dithiocarbamate | 30 | 1,650 | 480 | 800 | (1) | (1) | (1) | (1) | (1) | (1) |

[1] Not tested.

The above data show that conventional thiuram sulfides or thiocarbamates are effective for the purposes of the present invention in improving the sulfur-free cure of chlorinated butyl rubber with bivalent metal oxides such as zinc oxide.

Examples XXXI–XXXIV

Various samples of chlorinated butyl rubber "A" were each compounded on a rubber mill with 50 parts by weight of EPC carbon black, 1 part by weight of stearic acid, 10 parts by weight of Necton-60 hydrocarbon plasticizer oil, 5 parts by weight of zinc oxide, 1 part by weight of tetramethyl thiuram disulfide, and in some instances, a sulfur-containing accelerator (i.e., benzothiazyl disulfide) and/or an antioxidant. The amounts in parts by weight of these last-mentioned ingredients, as well as the physical properties of the vulcanizates, which had been cured at 307° F. for various periods of time, are shown below in Table V.

TABLE V

| Example | XXXI | XXXII | XXXIII | XXXIV |
|---|---|---|---|---|
| Accelerator, i.e., Benzothiazyl disulfide | 0 | 0 | 1 | 1 |
| Antioxidant, i.e., 2,2'-methylene-bis (4-methyl-6-tertiary butyl phenol) | 0 | 1 | 0 | 1 |
| Cured 10 min @ 307° F.: | | | | |
| Tensile (p.s.i.) | 1,775 | 1,725 | 2,160 | 2,250 |
| Modulus @ 300% E. (p.s.i.) | 750 | 750 | 925 | 690 |
| Elongation, percent | 520 | 505 | 555 | 655 |
| Cured 20 min. @ 307° F.: | | | | |
| Tensile (p.s.i.) | 2,000 | 2,175 | 2,485 | 2,450 |
| Modulus @ 300% E. (p.s.i.) | 1,200 | 1,050 | 1,025 | 920 |
| Elongation, percent | 435 | 460 | 570 | 590 |
| Cured 40 min. @ 307° F.: | | | | |
| Tensile (p.s.i.) | 2,340 | 2,270 | 2,450 | 2,550 |
| Modulus @ 300% E. (p.s.i.) | 1,450 | 1,500 | 1,340 | 1,250 |
| Elongation, percent | 410 | 405 | 495 | 530 |

The above data show that the presence or absence of a conventional antioxidant does not preclude the benefits of the present invention. The data also show that the presence of a typical sulfur-containing accelerator (i.e., benzothiazyl disulfide) beneficially increases both the tensile strength and elongation of the resulting vulcanizate cured in accordance with the present invention.

Additional runs were made in which chlorinated butyl rubber "A" was compounded again as above and, in two other instances (sample A and sample B), also with a small amount of added sulfur. The amounts in parts by weight of the ingredients added, as well as the Goodrich Flexometer data (obtained in accordance with Example I) and in all instances for a run time of 30 minutes, a load of 89 p.s.i. and a stroke of 0.25 inch), after a 45-minute cure at 307° F., were as shown below in Table VI.

TABLE VI

| Example | XXXI | XXXII | XXXIII | XXXIV | Sample A | Sample B |
|---|---|---|---|---|---|---|
| Accelerator, i.e., benzothiazyl disulfide | | | 1.0 | 1.0 | 1.0 | 1.0 |
| Sulfur | | | | | 0.5 | 1.0 |
| Antioxidant, i.e., 2,2'-methylene-bis (4-methyl-6-tertiary butyl phenol) | | 1.0 | | 1.0 | 1.0 | 1.0 |
| Change in temperature (° C.) [1] | 13 | 14 | 18 | 19 | 22 | 22 |
| Permanent Set [1] | 2.4 | 2.2 | 3.7 | 4.4 | 11.4 | 13.2 |

[1] Goodrich Flexometer data.

The above data show that the presence of even very small quantities of sulfur (e.g., 0.5 parts by weight per 100 parts by weight of chlorinated butyl rubber) such as in sample A, results in a considerably higher permanent set, which is disadvantageous.

*Examples XXXV–XLI*

Additional samples of chlorinated butyl rubber "A" were compounded as in Example XIX and employing the same control as in Table IV. The amount of tetramethyl thiuram disulfide was varied, on a weight basis, from 0.1 to 8.0 parts per hundred parts of rubber. Upon curing at 307° F. for the indicated periods of time, the tensile strength (in p.s.i.), elongation (in percent) and extension modulus at 300% elongation (in p.s.i.) were as shown below in Table VII.

TABLE VII

| Example | Control | XXXV | XXXVI | XXXVII | XXXVIII | XXXIX | XL | XLI |
|---|---|---|---|---|---|---|---|---|
| Tetramethyl thiuram disulfide, pphr | 0 | 0.1 | 0.3 | 1.0 | 2.0 | 4.0 | 6.0 | 8.0 |
| Cured 10 min. @ 307° F.: | | | | | | | | |
| Tensile | 1,025 | 1,345 | 1,850 | 2,470 | 2,430 | 1,900 | 1,460 | 1,400 |
| Modulus | 335 | 645 | 980 | 1,625 | 1,175 | 825 | 725 | 700 |
| Elongation | 530 | 530 | 475 | 435 | 530 | 550 | 485 | 460 |
| Cured 20 min. @ 307° F.: | | | | | | | | |
| Tensile | 1,490 | 1,720 | 2,095 | 2,430 | 2,475 | 2,075 | 1,800 | 1,700 |
| Modulus | 905 | 1,020 | 1,360 | 1,795 | 1,440 | 1,200 | 1,000 | 1,000 |
| Elongation | 460 | 430 | 415 | 395 | 475 | 455 | 455 | 430 |
| Cured 40 min. @ 307° F.: | | | | | | | | |
| Tensile | 1,705 | 1,950 | 2,260 | 2,445 | 2,520 | 2,300 | 2,010 | 1,900 |
| Modulus | 1,195 | 1,140 | 1,530 | 1,970 | 1,520 | 1,350 | 1,350 | 1,350 |
| Elongation | 395 | 430 | 400 | 360 | 445 | 445 | 400 | 375 |

The above data show that the curing aids of the invention such as tetramethyl thiuram disulfide are effective, for the purposes of the present invention, in concentrations of from at least about 0.1 to 8.0 parts by weight per 100 parts by weight of rubber. This is demonstrated by the higher tensile strength and modulus at 300% elongation exhibited by the vulcanizates of Examples XXXV to XLI, compared to the control.

The compositions comprising chlorinated isoolefinmultiolefin copolymers, vulcanized in accordance with the present invention may be advantageously used in pneumatic tubeless type tires as shown and described in Figure V and pages 34 to 37 of application Serial No. 512,182, filed May 31, 1955, said description being hereby incorporated by reference into the present specification. The compositions of the present invention also have utility in curing bags, tire casing curing diaphragms or bladders, conveyor belting, transmission belting, steam hose, electrical insulation, inner tubes, inner-tube-containing tires, blown sponge rubber, car window channel strips, proofed goods, general molded mechanical goods and other applications where butyl rubber, certain chloroalkadiene rubbery homopolymers or copolymers and other rubberlike polymers have utility as shown and described in Figures II to V and pages 27 to 30 of application Serial No. 597,993, filed July 16, 1956, the description of which is also hereby incorporated into the present application by reference.

Resort may be had to modifications and variations of the specific embodiments of the invention disclosed herein without departing from the spirit of the invention or the scope of the appended claims.

What is claimed is:

1. A composition which comprises about 100 parts by weight of the reaction product of an isoolefin-multiolefin rubbery polymer with a chlorinating agent, said reaction product containing at least about 0.5 weight percent chlorine on a basis of the total weight of the polymer but not more than about one combined atom of chlorine per double bond in said polymer; and a minor proportion, sufficient to improve dynamic fatigue resistance, of an admixture of about 0.5 to 50 parts by weight of zinc oxide and about 0.05 to 15 parts by weight of a modifying agent selected from the group consisting of thiuram sulfides, thiocarbamates and mixtures thereof, said composition being free of added elemental sulfur.

2. A composition comprising a rubbery polymer having a Staudinger molecular weight above about 20,000, comprising atoms of hydrogen, carbon, and chlorine, containing in its structure a major proportion of hydrocarbon units derived by the polymerization of isoolefins containing about 4 to 14 carbon atoms, and also containing sufficient units in which a pair of carbon atoms is linked by an olefinic double bond that the mole percent unsaturation of the polymer is from about 0.5 to 50.0; said polymer containing at least 0.5 weight percent chlorine but not more than about one combined atom of chlorine per double bond in the polymer; 100 parts by weight of said polymer being in composition with about 0.5 to 50 parts by weight of zinc oxide and about 0.05 to 15 parts by weight of a modifying agent selected from the group consisting of thiuram sulfides, thiocarbamates, and mixtures thereof, said composition being free of added elemental sulfur.

3. A vulcanized composition comprising about 100 parts by weight of a rubbery polymer having a Staudinger molecular weight of between about 20,000 and 150,000, comprising atoms of hydrogen, carbon and chlorine, containing in its structure from about 85 to 99.5 weight percent of hydrocarbon units derived by the polymerization of an isoolefin containing about 4 to 10 carbon atoms, and also containing sufficient atoms in which a pair of carbon atoms is linked by an olefinic double bond that the mole percent unsaturation of the polymer is from about 0.5 to 35, said polymer containing at least about 0.5 weight percent combined chlorine but not more than about "X" weight percent combined chlorine wherein "X" equals:

$$\frac{35.46}{(100-L)M_1 + L(M_2+35.46)} \times 100$$

and:

L=mole percent of the multiolefin in the polymer
$M_1$=molecular weight of the isoolefin
$M_2$=molecular weight of the multiolefin and
35.46=atomic weight of chlorine said polymer being in admixture with a minor proportion, sufficient to improve dynamic fatigue resistance, of an admixture of about 0.5 to 50 parts by weight of zinc oxide and about 0.05 to 15 parts by weight of a modifying agent selected from the group consisting of thiuram sulfides, thiocarbamates, and mixtures thereof, said composition being free of added elemental sulfur.

4. A shaped article of manufacture containing therein the composition of claim 3.

5. A pneumatic tubeless rubber tire containing therein the composition of claim 3.

6. Composition according to claim 3 in which the modifying agent is a thiuram sulfide.

7. Composition according to claim 3 in which the modifying agent is a thiocarbamate.

8. A vulcanized rubber composition comprising a copolymer comprising about 85 to 99.5 weight percent of a $C_4$ to $C_{10}$ isoolefin and about 15 to 0.5 weight percent of a $C_4$ to $C_{18}$ multiolefin; said composition having combined therein at least about 0.5 weight percent chlorine on the basis of the total weight of copolymer but not more than about one atom of chlorine per double bond in said copolymer; said composition being in admixture with about 0.2 to 3.0 weight percent of a sulfur-containing accelerator, about 0.1 to 10.0 weight percent of a modifying agent selected from the group consisting of thiuram sulfides, thiocarbamates, and mixtures thereof and about 1 to 50 weight percent of zinc oxide; said composition being free of added elemental sulfur.

9. Composition according to claim 8 in which the modifying agent is a $C_1$ to $C_6$ tetraalkyl thiuram sulfide.

10. Composition according to claim 8 in which the modifying agent is a $C_6$ to $C_{12}$ tetraaryl thiuram sulfide.

11. Composition according to claim 8 in which the modifying agent is a $C_1$ to $C_6$ metal alkyl thiocarbamate.

12. Composition according to claim 8 in which the modifying agent is an amine salt of a $C_1$ to $C_6$ N-alkyl thiocarbamic acid.

13. Composition according to claim 8 in which the modifying agent is a nitro $C_6$–$C_{12}$ aryl dialkyl dithiocarbamate.

14. In a process for vulcanizing rubbery chlorinated isoolefin-multiolefin copolymers, said copolymers containing at least 0.5 weight percent chlorine but not more than about one atom of chlorine per double bond in the copolymer, the improvement which comprises compounding about 100 parts by weight of said chlorinated copolymer with a minor proportion, sufficient to improve dynamic fatigue resistance, of an admixture of about 0.5 to 50 parts by weight of zinc oxide and about 0.05 to 15 parts by weight of a modifying agent selected from the group consisting of thiuram sulfides, thiocarbamates, and mixtures thereof, and curing the resulting mixture in the absence of added elemental sulfur at a temperature between about 200° and 450° F. for between about 0.5 minute and 5 hours.

15. Process according to claim 14 in which the chlorination is performed at a temperature between about 20° and about 80° C., the vulcanization being at a temperature between about 250° and 400° F. in the presence of about 0.1 to 10.0 weight percent, based on copolymer of an accelerator containing combined sulfur, said accelerator being other than thiuram sulfides and thiocarbamates.

16. A vulcanized chlorine-containing rubbery composition comprising a major amount of a blend of a minor proportion based on total rubber of a high unsaturation rubber and the remainder of total rubber being a low unsaturation isoolefin-multiolefin-containing rubbery copolymer having a Wijs iodine number below about 50, about 100 parts by weight of said copolymer having combined therein at least about 0.5 weight percent chlorine but insufficient chlorine to substantially alter the molecular weight of said rubbery copolymer, and a minor amount, sufficient to improve dynamic fatigue resistance, of an admixture comprising about 0.5 to 50 parts by weight of zinc oxide and about 0.05 to 15 parts by weight of a modifying agent selected from the group consisting of thiuram sulfides, thiocarbamates, and mixtures thereof, said composition being substantialy free of added elemental sulfur, said composition when vulcanized exhibiting improved ozone resistance.

17. Composition according to claim 16 in which the high unsaturation rubber is present in an amount of about 0.5 to 30% by weight based on total rubber and is selected from the group consisting of diene-styrene copolymers, natural rubber, and mixtures thereof.

18. A process for improving the heat aging and ozone resistance of an isoolefin-multiolefin butyl rubber copolymer having a mole percent unsaturation between about 0.5 and 10.0 which has been chlorinated to contain at least 0.5 weight percent chlorine but not more than about one atom of chlorine per double bond in the copolymer, said process comprising in combination, producing an elemental sulfur-free blend of a major amount of a mixture of a major proportion of about 100 parts by weight of the chlorinated butyl rubber copolymer formed with a minor proportion based on total rubber of a more highly unsaturated rubber having a mole percent unsaturation between above about 10 to about 100 and, per 100 parts by weight of total rubbers, about 0.5 to 50 parts by weight of zinc oxide and about 0.05 to 15 parts by weight of a modifying agent selected from the group consisting of thiuram sulfides, thiocarbamates and mixtures thereof and curing the resulting blend in the absence of added elemental sulfur at a temperature of about 200° to 450° F. for between about 0.05 minute and 5 hours.

References Cited in the file of this patent

UNITED STATES PATENTS

| | | |
|---|---|---|
| 2,702,286 | Iknayan et al. | Feb. 15, 1955 |
| 2,732,354 | Morrissey et al. | Jan. 24, 1956 |